United States Patent Office 3,591,410
Patented July 6, 1971

3,591,410
TREATMENT OF RUBBERY MATERIAL
Edward O. Ross, 6118 Sadring Ave.,
Woodland Hills, Calif. 91364
No Drawing. Filed Nov. 15, 1967, Ser. No. 683,159
Int. Cl. C08c 1/06; C08k 1/28
U.S. Cl. 117—139                                   10 Claims

ABSTRACT OF THE DISCLOSURE

A composition for treating the surface of rubbery material for maintaining or restoring texture, comprising an aqueous solution of a penetrating agent and a rubber preservative which may also contain a bacteriacide is disclosed. Glycerine and an alginate are disclosed as the penetrating agent and preservative, respectively.

The term rubbery material is meant to include not only products made entirely of rubber but also cloth impregnated with rubber and/or over-coated therewith, as well as mixtures of rubber and other non-rubber materials.

BACKGROUND OF THE INVENTION

(1) Field of the invention

This invention pertains to the field of chemical treatment of rubber.

The term "rubber" is meant to include natural rubber such as Hevea and Ficus rubbers and also synthetic rubbers such as polyisoprene, polybutadiene, GRS polybutadienestyrene, Buna N (from 1:3 butadiene and acrylonitrile), neoprene, butyl rubber and the like, as well as other materials having similar or like characteristics.

(2) Description of the prior art

There are many well-established procedures and methods for chemically treating rubber and/or rubbery materials during their formulation and processing. Additives are incorporated: to prevent oxidation, to control tensile strength and elasticity, to extend the rubber and to impart particularly desired textural and other physical properties. However, conventionally after being embodied into products, the materials are seldom given further treatment. As a result, usually in time, the desirable physical characteristics of the rubber or rubbery material deteriorate and the product becomes ineffective, even though it is still structurally sound.

For example, in some applications, extended and repeated flexure, friction and pressure can destroy the desired characteristics of the rubber or rubbery material. For example, grips of rubbery material used on golf clubs are usually considered more desirable when they have been "worn in" so that they more closely conform to the user's grip and peculiarities of his hands and fingers. However, at about that time, the rubber begins to lose its tackiness and becomes hard and slick, becoming useless as a grip. As another example, stress and the passage of time can cause the side walls of automobile tires to so deteriorate that it is often unsafe to re-cap tires that are more than a few years old.

SUMMARY OF THE INVENTION

The foregoing problems are alleviated by the present invention which provides a composition for treating the surface of rubber or rubbery material for maintaining or restoring its properties. Such composition comprises an aqueous solution with a pentrating agent and a rubber preservative. The composition may also include a bacteriacide.

The term "rubber preservative" is meant to refer to materials capable of preserving the physical properties of rubber or rubbery material, particularly its surface properties such as texture, tackiness, etc. The term "penetrating agent" is meant to refer to materials capable of causing the preservative to penetrate into the surface of rubber or rubbery material. A variety of such materials are well known. In a particular embodiment of the invention, the penetrating agent is glycerine. Alginates have been found effective as preservatives with sodium alginate being particularly suitable. Water soluble bacteriacides are most effective, phenates being particularly effective, notably sodium pentachlorophenate.

DESCRIPTION OF THE PREFERRED EMBODIMENTS

A solution of this invention was made by combining the following components:

|  | Parts by weight |
|---|---|
| Water | 80.25 |
| Glycerine | 19.4 |
| Sodium alginate | 0.25 |
| Dowicide G | 0.1 |

Glycerine is a penetrating agent and the sodium alginate is a rubber preservative. Dowicide G is a trade name of the Dow Chemical Company, Midland, Mich., for sodium pentachlorophenate.

The solution is applied to the surface of rubber or a rubbery material. In one specific example, the solution was applied to a golf club grip made of rubbery material, by swabbing the grip with the solution or by placing the solution on the hand and then rubbing the hand along the grip. The solution may be left to dry or any excess wiped off if desired. Such application after each period of extended use maintains the tackiness and firmness of the grip. Tackiness is restored to a worn golf club grip after only a few applications.

In the foregoing illustrative example, the golf club grip was made of polyisoprene but it could have all been made of natural rubber or any of the other synthetic rubbers listed above and could have included fibrous material suspended throughout.

The foregoing formulation is particularly suitable for treating rubbery material, yielding exceptional results with only a few applications. However, other materials can be substituted and yield satisfactory results. In general, other penetrating agents that can be used in place of the glycerine include glyceryl diricinoleate dimethylsulfoxide, trihydric alcohols, such as 1,2,3-pentanetriol, dihydric alcohols such as ethylene glycol, propylene glycol, isobutylene glycol, B-butylene, 2,3-butanediol, γ-pentylene glycol, and the like. The penetrating agent should be water soluble and capable of penetrating into the pores of rubber or rubbery material.

The alginates, such as potassium alginate, ammonium, and particularly sodium alginate have been found to be the most effective preservatives. Other preservatives that can be used include potassium caseinate, Witco K–8300 (a trade name for a fatty acid sulfate, Aquarex D (trade name for a sodium alkali sulfate, and the like. In general, well known protective agents and stabilizers are useful as preservatives herein; see, for example, such materials as are listed on pages 738–739 of the 1967 Rubber Red Book, published by the Palmerton Publishing Company, Inc., New York, N.Y. It is not necessary that the preservative be water soluble as long as it can be adequately suspended in the formulation; e.g. as by homogenization, but solubility in the water-penetrant solution is desired.

Unbleached sodium alginate has been found to be particularly useful and such is available in various viscosity grades. When it is used, a relatively low viscosity grade is most suitable for providing a low viscosity solution.

However, in some applications, e.g. in the treatment of tires, a higher viscosity solution has been found to yield better results, and therefore a higher viscosity grade of alginate can be used. Alternatively, one could increase the amount of low viscosity grade alginate, for example, by doubling its concentration with a corresponding decrease in the amount of water.

The Dowicide G can be replaced with another bacteriacide such as: potassium methyldithiocarbamate, Germ-I-Tol, a trade name for bacteriocidal quaternary ammonium compounds of the higher alkyl dimethyl benzyl ammonium chloride type; Arquad 12, a trade name for a bacteriocidal mixture of alkyl dimethyl ammonium chloride and dialkyl dimethyl ammonium chloride (alkyl is 90% dodecyl, 9% tetradecyl and 1% octadecenyl); and the like. Phenate bacteriocides, notably the water soluble forms are preferred as generally more useful in the present formulations. Such phenates include sodium 2,4,5-trichlorophenate, sodium o-phenylphenate tetrahydrate and sodium 2,3,4,6-tetrachlorophenate, and the like. Sodium pentachlorophenate (Dowicide G type) is particularly suitable with the present formulations.

The relative amounts of the foregoing ingredients to obtain the most effective formulations depend on the particular ingredients chosen, the nature of the article to be treated, and the method of treatment. As noted, it is somewhat more desirable to have a higher viscosity solution for the treatment of tires than for the treatment of golf club grips. A higher viscosiy is particularly desirable when the solution is to be applied without rubbing. In general, from about 5 to about 50 weight percent of rubber penetrant, from about 0.05 to about 5 weight percent of a rubber preservative, and from about 0.01 to about 2 weight percent of the bacteriocide are suitable. When glycerine and unbleached sodium alginate are used, particularly suitable concentrations are about 19–20 weight percent glycerine and about 0.25–0.5 weight percent sodium alginate. Sodium pentachlorophenate is suitably present as a bacteriocide at about 0.1 weight percent.

There has thus been disclosed a composition for treating the surface of products formed of rubber or rubbery material to restore or preserve the desired characteristics thereof. The various disclosed embodiments and examples of use were for purposes of illustration only and are not to be taken as limitations upon the scope of the claims appended hereto.

What is claimed is:

1. The method of treating the surface of rubber and rubbery material for maintaining or restoring the properties thereof comprising applying to the surface a composition consisting essentially of from about 5 to about 50 weight percent of water soluble penetrating agent which is capable of penetrating into the pores of rubber or rubbery material, said penetrating agent being selected from the group consisting essentially of glyceryl diricinoleate, dimethyl sulfoxide, a trihydric alcohol and a dihydric alcohol, and from about 0.5 to about 5 weight percent of a rubber preservative soluble or dispersible in said aqueous solution of penetrating agent and capable of preserving the surface properties of said rubbery material.

2. The method according to claim 1 wherein the penetrating agent is glycerine.

3. The method according to claim 1 wherein the preservative is an alginate.

4. The method according to claim 1 wherein the preservative is sodium alginate.

5. The method according to claim 1 in which said aqueous solution contains from about 0.2 to about 2 weight percent of a water-soluble bacteriacide.

6. The method according to claim 1 in which said aqueous solution consists essentially of from about 50 to about 95 weight percent of water, from about 5 to about 50 weight percent of glycerine and from about 0.05 to about 5 weight percent of an alginate.

7. The method according to claim 6 in which said aqueous solution additionally contains from about 0.2 to about 2 weight percent of a water-soluble bacteriacide.

8. The method according to claim 6 wherein the alginate is sodium alginate.

9. The method according to claim 8 in which said aqueous solution has the following proportions:

| | Weight percent |
|---|---|
| Water | 80–81 |
| Glycerine | 19–20 |
| Sodium alginate | 0.25–0.5 |

10. The method according to claim 9 in which said aqueous solution contains about 0.1% of sodium pentachlorophenate.

References Cited

UNITED STATES PATENTS

| 2,376,650 | 5/1945 | Ballman | 424—347 |
| 2,978,372 | 4/1961 | Bergstedt et al. | 260—17.4X |
| 3,116,827 | 1/1964 | Gilchrist | 260—17.4X |
| 3,329,509 | 7/1967 | Julius | 260—17.4X |

OTHER REFERENCES

Rose et al.: Condensed Chemical Dictionary, 6th Edition, 1961, Reinhold Publ. Corp., New York, pp. 540 and 541.

RICHARD D. LOVERING, Primary Examiner

I. GLUCK, Assistant Examiner

U.S. Cl. X.R.

252—384, 407; 260—17.4, 814